(12) United States Patent
Yamaoka et al.

(10) Patent No.: US 10,234,957 B2
(45) Date of Patent: *Mar. 19, 2019

(54) INFORMATION PROCESSING DEVICE AND METHOD, PROGRAM AND RECORDING MEDIUM FOR IDENTIFYING A GESTURE OF A PERSON FROM CAPTURED IMAGE DATA

(71) Applicant: SONY CORPORATION, Tokyo (JP)

(72) Inventors: Keisuke Yamaoka, Tokyo (JP); Jun Yokono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,975

(22) Filed: Mar. 16, 2018

(65) Prior Publication Data

US 2018/0210556 A1 Jul. 26, 2018

Related U.S. Application Data

(63) Continuation of application No. 15/174,585, filed on Jun. 6, 2016, now Pat. No. 9,952,678, which is a
(Continued)

(30) Foreign Application Priority Data

Jan. 29, 2009 (JP) .................................. 2009-018179

(51) Int. Cl.
*G06F 3/01* (2006.01)
*H04N 5/222* (2006.01)
(Continued)

(52) U.S. Cl.
CPC .............. *G06F 3/017* (2013.01); *A63F 13/40* (2014.09); *G06F 3/005* (2013.01); *G06F 3/011* (2013.01);
(Continued)

(58) Field of Classification Search
CPC ...... H04N 5/2224; H04N 5/222; G06F 3/017; G06F 3/0304; G06F 3/011; G06F 3/005;
(Continued)

(56) References Cited

U.S. PATENT DOCUMENTS 5,886,788 A 3/1999 Kobayashi
6,455,835 B1 9/2002 Bernardini et al.
(Continued)

FOREIGN PATENT DOCUMENTS

| JP | 9-273920 | 10/1997 |
|---|---|---|
| JP | 2008-15895 | 1/2008 |
| JP | 2008-15895 A | 1/2008 |

OTHER PUBLICATIONS

Masamoto et al., "Movement Recognition Method Using the Shape Feature From a Single Eye Picture," Trial to Realize a Movement Recognizer which is Excellent about the Position and the direction of a Person, No. 70, National Convention Lecture Memoirs 5, Information Processing Society of Japan, pp. 5-93 and 5-94, (2008).
(Continued)

*Primary Examiner* — Luong T Nguyen
(74) *Attorney, Agent, or Firm* — Xsensus LLP

(57) ABSTRACT

An information processing device includes: an outline extraction unit extracting an outline of a subject from a picked-up image of the subject; a characteristic amount extraction unit extracting a characteristic amount, by extracting sample points from points making up the outline, for each of the sample points; an estimation unit estimating a posture of a high degree of matching as a posture of the subject by calculating a degree of the characteristic amount extracted in the characteristic amount extraction unit being matched with each of a plurality of characteristic amounts that are prepared in advance and represent predetermined postures different from each other; and a determination unit
(Continued)

determining accuracy of estimation by the estimation unit using a matching cost when the estimation unit carries out the estimation.

19 Claims, 13 Drawing Sheets

Related U.S. Application Data continuation of application No. 13/756,977, filed on Feb. 1, 2013, now Pat. No. 9,377,861, which is a continuation of application No. 12/688,665, filed on Jan. 15, 2010, now Pat. No. 8,395,676.

(51) Int. Cl.
*G06K 9/00* (2006.01)
*G06F 3/03* (2006.01)
*G06F 3/00* (2006.01)
*A63F 13/40* (2014.01)

(52) U.S. Cl.
CPC ....... *G06F 3/0304* (2013.01); *G06K 9/00342* (2013.01); *G06K 9/00369* (2013.01); *H04N 5/222* (2013.01); *H04N 5/2224* (2013.01)

(58) Field of Classification Search
CPC .. G06K 9/00342; G06K 9/00369; A63F 13/40
See application file for complete search history.

(56) References Cited

U.S. PATENT DOCUMENTS

| | | |
|---|---|---|
| 7,123,745 B1 | 10/2006 | Lee |
| 7,702,019 B2 | 4/2010 | Iwasaki et al. |
| 8,103,091 B2 | 1/2012 | Hosoi |
| 8,107,726 B2 | 1/2012 | Xu et al. |
| 8,229,164 B2 | 7/2012 | Miyamoto |
| 9,377,861 B2 | 6/2016 | Yamaoka et al. |
| 9,952,678 B2* | 4/2018 | Yamaoka ............... G06F 3/017 |
| 2002/0010691 A1* | 1/2002 | Chen ................. G06K 9/6278 706/20 |
| 2002/0181773 A1 | 12/2002 | Higaki et al. |
| 2004/0190776 A1 | 9/2004 | Higaki |
| 2005/0271279 A1 | 12/2005 | Fujimura |
| 2007/0084278 A1* | 4/2007 | Kawal ................. A61B 5/1038 73/172 |
| 2007/0268295 A1 | 11/2007 | Okada |
| 2008/0019589 A1 | 1/2008 | Yoon et al. |
| 2008/0031512 A1* | 2/2008 | Mundermann .... G06K 9/00342 382/154 |
| 2008/0247649 A1 | 10/2008 | Cheng |
| 2009/0080780 A1* | 3/2009 | Ikeda ................. G06K 9/00369 382/209 |
| 2009/0141982 A1 | 6/2009 | Suzuki |

OTHER PUBLICATIONS

Notification of Reasons for Refusal issued in Japanese Patent Publication No. 2009-018179 dated Dec. 2, 2010.

* cited by examiner

INFORMATION PROCESSING DEVICE AND METHOD, PROGRAM AND RECORDING MEDIUM FOR IDENTIFYING A GESTURE OF A PERSON FROM CAPTURED IMAGE DATA

CROSS-REFERENCE TO RELATED APPLICATIONS

This application is a continuation of U.S. patent application Ser. No. 15/174,585 filed Jun. 6, 2016, which is a continuation of U.S. patent application Ser. No. 13/756,977 filed Feb. 1, 2013, which is a continuation of U.S. patent application Ser. No. 12/688,665 filed Jan. 15, 2010 (now U.S. Pat. No. 8,395,676), which claims the benefit of priority to Japanese Patent Application No. 2009-018179 filed Jan. 29, 2009. The entire contents of each of which are incorporated by reference herein.

BACKGROUND OF THE INVENTION

1. Field of the Invention

The present invention relates to an information processing device, an information processing method, a program, and a recording medium and, more particularly, relates to an information processing device, an information processing method, a program, and a recording medium that can, for example, estimate a posture of a subject and determine the accuracy of the estimation.

2. Description of the Related Art

As a technique for gesture recognition, techniques, such as Eagle & Hawk Digital System™ of Motion Analysis Corporation, U.S., and MX Motion Capture™ of Vicon Peak, U.S., for example, are proposed. Such techniques pick up a plurality of images of a person by a plurality of cameras after attaching markers on the person's body or putting gloves with a special sensor built thereinto on the person's hands and estimate a posture of the person from the plurality of picked-up images to recognize a gesture of the person.

In addition, motion region extraction techniques, such as Eye Toy® system of Sony Computer Entertainment Europe Limited for Playstation® of Sony Computer Entertainment Inc. for example, are proposed. Such techniques pick up an image of a person by one camera and extracts a region with the person's motion in the picked-up image using a difference between the picked-up image and a background image in which only a background is picked up without including the person or a difference between frames of the picked-up image.

Further, there also exists a technique that detects, when an incident image is introduced to a holographic element where a plurality of reference posture images are each recorded using, for example, a reference light having a corresponding incident angle, the intensity and direction of light exiting from the holographic element, and determines whether or not the incident image matches one of the plurality of reference posture images in accordance with the detected intensity and direction of the light (for example, refer to Japanese Unexamined Patent Application Publication No. 9-273920).

SUMMARY OF THE INVENTION

In the gesture recognition techniques described above, however, when images of a person are picked up, markers are attached on a person's body in a very large studio equipped with a plurality of cameras, or gloves are put on the person's hands to pick up the images using the plurality of cameras, which usually places a heavy burden on the person.

Further, although the motion region extraction techniques take no additional preparation, such as attaching markers or the like on a person, functions of the techniques have been limited to, for example, extraction of the region of movement in a picked-up image.

The present invention have been made in view of such a situation. It is desirable to readily estimate a posture of an estimation object without placing a burden on the estimation object, such as a person.

An information processing device according to an embodiment of the present invention includes: outline extraction means for extracting an outline of a subject from a picked-up image of the subject: characteristic amount extraction means for extracting a characteristic amount, by extracting sample points from points making up the outline, for each of the sample points; estimation means for estimating a posture of a high degree of matching as a posture of the subject by calculating a degree of the characteristic amount extracted in the characteristic amount extraction means being matched with each of a plurality of characteristic amounts that are prepared in advance and represent predetermined postures different from each other: and determination means for determining accuracy of estimation by the estimation means using a matching cost when the estimation means carries out the estimation.

The estimation means may use characteristic amounts, by regarding a sample point positioned at a predetermined position of the subject in the image as a starting point, which are extracted from sample points including the starting point and positioned in the vicinity of the starting point.

The characteristic amounts may be shape context characteristic amounts.

The plurality of characteristic amounts prepared in advance and representing predetermined postures different from each other may be managed in a database of a tree structure.

The device may further include silhouette extraction means for extracting a silhouette representing a region in which the subject shows up from the picked-up image of the subject. The outline extraction means may extract the outline from the silhouette.

The device may further include calculation means for calculating a distance, by executing a process of deforming the posture estimated by the estimation means to be into the silhouette, between a sample point making up an outline after the fitting and a sample point of the silhouette. The determination means may carry out the determination using at least one of the matching cost and the distance supplied from the calculation means.

The determination means may include a discriminator learned by Boosting.

An information processing method according to an embodiment of the present invention, being the method for an information processing device estimating a posture of a subject from a picked-up image of the subject, the method includes the steps of: extracting an outline of the subject from the picked-up image; extracting a characteristic amount, by extracting sample points from points making up the outline, for each of the sample points; estimating a posture of a high degree of matching as a posture of the subject by calculating a degree of the extracted characteristic amount being matched with each of a plurality of characteristic amounts that are prepared in advance and represent predetermined postures different from each other; and determining accuracy of the estimated posture of the subject using a matching cost when the estimation is carried out.

A program according to an embodiment of the present invention is a computer readable program causing an information processing device, the device estimating a posture of a subject from a picked-up image of the subject, to execute a process including the steps of: extracting an outline of the subject from the picked-up image; extracting a characteristic amount, by extracting sample points from points making up the outline, for each of the sample points; estimating a posture of a high degree of matching as a posture of the subject by calculating a degree of the extracted characteristic amount being matched with each of a plurality of characteristic amounts that are prepared in advance and represent predetermined postures different from each other; and determining accuracy of the estimated posture of the subject using a matching cost when the estimation is carried out.

A recording medium according to an embodiment of the present invention has a computer readable program recorded therein that causes an information processing device, the device estimating a posture of a subject from a picked-up image of the subject, to execute a process including the steps of: extracting an outline of the subject from the picked-up image; extracting a characteristic amount, by extracting sample points from points making up the outline, for each of the sample points; estimating a posture of a high degree of matching as a posture of the subject by calculating a degree of the extracted characteristic amount being matched with each of a plurality of characteristic amounts that are prepared in advance and represent predetermined postures from each other; and determining accuracy of the estimated posture of the subject using a matching cost when the estimation is carried out.

In the information processing device, information processing method, the program, and the recording medium according to the embodiments of the present invention, an outline of a subject is extracted from a picked-up image of the subject, sample points are extracted from points making up the outline, a characteristic amount is extracted for each of the sample points, a matching degree is calculated that represents a degree of the characteristic amount being matched with each of a plurality of characteristic amounts prepared in advance and representing predetermined postures different from each other, a posture of a high degree of matching is estimated as a posture of the subject, and the estimation accuracy is determined.

According to embodiments of the present invention, a posture of an estimation object can be estimated easily without placing a burden on the estimation object.

DESCRIPTION OF THE PREFERRED EMBODIMENTS

Embodiments of the present invention are described below with reference to the drawings.

Embodiment

Figure 1:
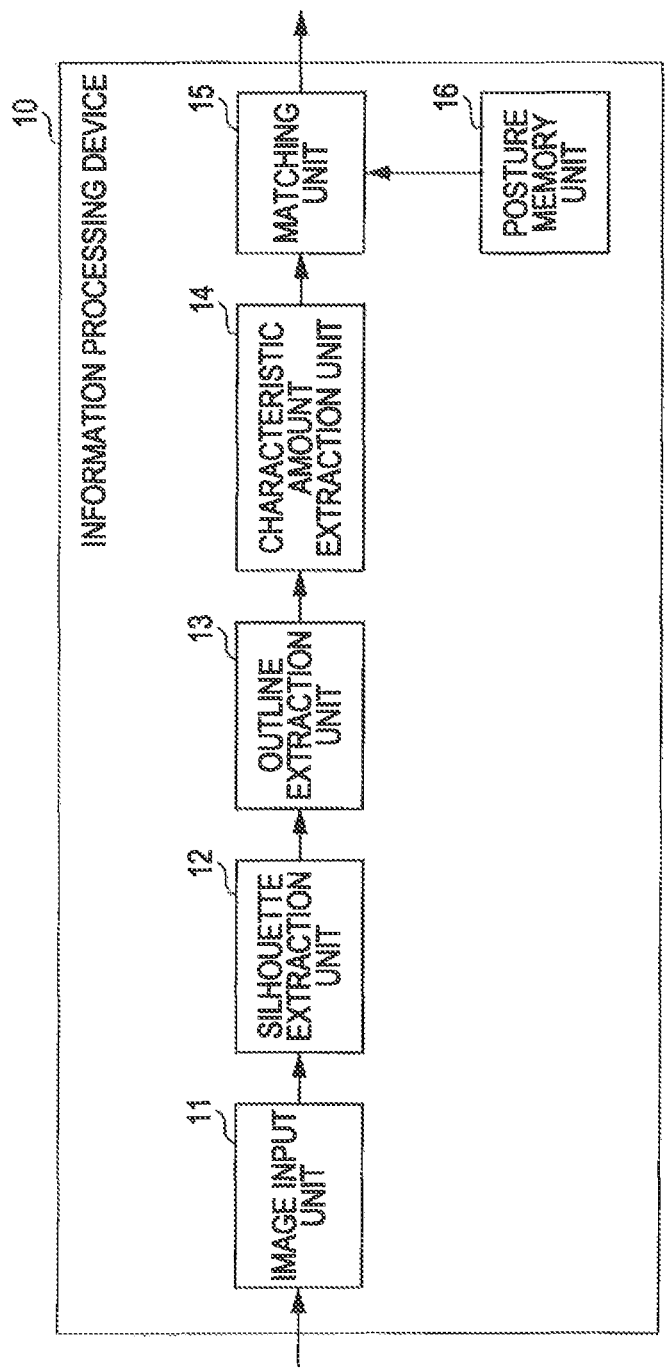
FIG. 1 is a block diagram illustrating a configuration of an information processing device to which an embodiment of the present invention is applied.

FIG. 1 illustrates a configuration of an information processing device to which an embodiment of the present invention is applied. An information processing device 10 illustrated in FIG. 1 can be applied to a device that picks up an image (captures a picked up image) and estimates a posture of the subject appeared in the image.

The information processing device 10 illustrated in FIG. 1 is configured to include an image input unit II, a silhouette extraction unit 12, an outline extraction unit 13, a characteristic amount extraction unit 14, a matching unit 15, and a posture memory unit-16. The image input unit 11 may be configured with a camera that picks up an image or may be configured with a device that has a function of capturing an image picked up by an image pickup device, such as a camera. The image input unit 11 picks up an image of, for example, a person as a subject to deliver the picked-up image obtained by the image pickup to the silhouette extraction unit 12.

The silhouette extraction unit 12 detects (extracts) a silhouette representing a region in which the person in the image shows up from the image input to the image input unit 11 and generates a silhouette image, which is an image in which the detected silhouette shows up to deliver to the outline extraction unit 13. The outline extraction unit 13 carries out a process of extracting an outline of the subject from within the silhouette image delivered from the silhouette extraction unit 12. Because the silhouette image is already binarized, the outline is extracted by extracting the edge.

An outline image of the outline extracted in the outline extraction unit 13 is delivered to the characteristic amount extraction unit 14. The characteristic amount extraction unit 14 extracts a predetermined characteristic amount from the delivered outline image to deliver to the matching unit 15. In the posture memory unit 16, the characteristic amount obtained from an image when the subject is in a predetermined posture (referred to as a model posture image) is stored in advance for each of a plurality of postures. By matching the characteristic amount extracted by the characteristic amount extraction unit 14 with the characteristic amount for each of the model posture images stored in the posture memory unit 16, the matching unit 15 estimates a posture of the subject in the image picked up.

The information processing device 10 having such a configuration can be applied to, for example, a device that estimates a gesture of a subject and the like. When the accuracy of the estimation is at a predetermined threshold or more, it is also possible to have a configuration of adding parts of determining the accuracy of the estimation result (a fitting unit 102 and an accuracy determination unit 103 in FIG. 10) as described later as another embodiment when, for example, carrying out a process using the estimated posture or when learning such that the accuracy itself becomes at a predetermined threshold or more to seek the accuracy of estimation.

With the information processing device 10 illustrated in FIG. 1, the silhouette extraction unit 12 is provided and an example of a configuration in which the silhouette of the subject in the image is extracted in the silhouette extraction unit 12 and then the outline is extracted in the outline extraction unit 13 is illustrated. In the description that follows, the information processing device 10 with this configuration is used as an example. As another configuration of the information processing device 10, it is also possible to have a configuration, though not shown, without providing the silhouette extraction unit 12. That is, it may also be a configuration in which the image from the image input unit 11 is directly delivered to the outline extraction unit 13 and a configuration in which the outline of the subject in the image is extracted from the image without extracting the silhouette in the outline extraction unit 13.

As a method of extracting an outline from an input image, for example, there is a method using a result of learning as described below. In simple terms, some of the pixels of a learning image are extracted from the input learning image as outline characteristic points used when generating an outline discriminator to deliver the extracted outline characteristic points and the learning image to a processing unit calculating the characteristic amount of the outline. Here, the outline discriminator is a relatively strong discriminator generated by statistical learning and made with a plurality of weak discriminators, and is a discriminator used when discriminating whether or not a region of a person's image exists among the input images utilizing the person's outline.

Based on the delivered learning image, the processing unit calculates an outline characteristic amount representing the extracted outline for each of the outline characteristic points by, for example, a filtering process using a steerable filter to deliver the obtained outline characteristic amount and the learning image to a generation unit that generates a discriminator for outlines. Based on the delivered learning image and outline characteristic amount, the generation unit carries out a process of statistical learning using, for example, Adaboost to generate an outline discriminator that recognizes a person, who is an object in the image. By using the outline discriminator thus generated as the outline extraction unit 13, an outline of the subject can be extracted from the image input to the image input unit 11.

However, as illustrated in FIG. 1, by extracting the outline after extracting the silhouette in the silhouette extraction unit 12, it is considered that the outline of the subject can be extracted more accurately. The outline of the subject can also be extracted even without carrying out such learning in advance as described above for discriminator generation. That is, when obtaining a silhouette by the silhouette extraction unit 12, a binarized image is generated that is represented by black pixels and white pixels as described later. Therefore, from such a binarized image, the parts in which black pixels and white pixels are adjacent to each other may be extracted as an outline, and the outline can be extracted more accurately.

From such reasons, it may have a configuration provided with the silhouette extraction unit 12 as the information processing device 10 as illustrated in FIG. 1 when, for example, accuracy in posture estimation is increased, and it may also have a configuration not provided with the silhouette extraction unit 12 when, for example, the accuracy may be low. It may also be a configuration provided with the silhouette extraction unit 12 in a case that the posture is estimated with a higher accuracy by being provided with the silhouette extraction unit 12 in consideration of the type, resolution, and the like of the image input to the image input unit 11, and may also be a configuration not provided with the silhouette extraction unit 12 in a case that the posture can be estimated with a high accuracy even without being provided with the silhouette extraction unit 12.

[Process Relating to Posture Estimation]

Next, a description is given to a behavior of the information processing device 10 illustrated in FIG. 1. Firstly, with reference to the flowcharts in FIGS. 2 and 3, a description is given to the processes relating to the posture estimation carried out by the information processing device 10.

In step S101, the image input unit 11 captures an image. In a case that the image input unit 11 is configured to include, for example, a camera to pick up a still image, an image picked up by the camera is captured, and in a case that it is configured to include a camera to take a video, an image (one frame) is captured that is part of the video taken by the camera. Alternatively, an image may also be captured that is, for example, stored in another device through a network or the like.

In step S102, the image captured by the image input unit 11 is delivered to the silhouette extraction unit 12 to extract a silhouette in the silhouette extraction unit 12. That is, in the image delivered to the silhouette extraction unit 12, the subject appears and such an image is generated that the subject and the parts excluding the subject are clearly distinguished from each other. For example, an image as illustrated in FIG. 4 is generated by the silhouette extraction unit 12.

Figure 4:
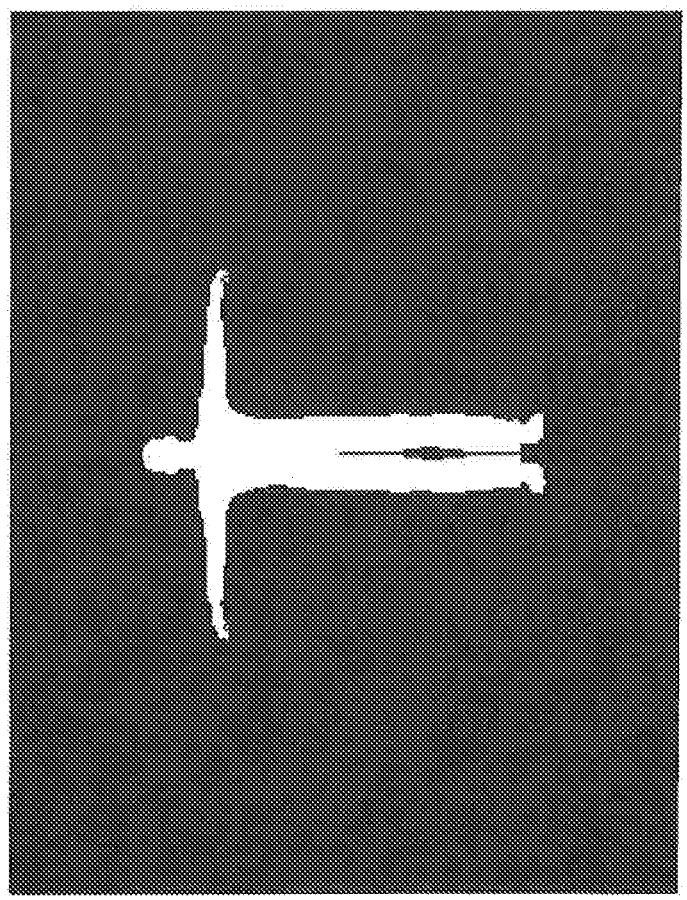
FIG. 4 illustrates an example of a silhouette image.

FIG. 4 shows an example of a silhouette image generated from the image by the silhouette extraction unit 12. The silhouette image is, for example, a binarized image in which a pixel value of each pixel is binarized to 0 or 1. The silhouette of the person in the silhouette image is represented by pixels in white (white pixels) that indicate a pixel value of 0 while the background in the silhouette image is represented by pixels in black (black pixels) that indicate a pixel value of 1.

As a method of detecting a silhouette of a person in an image, it is possible to use such a method that separates the background and the person image with a threshold of a distance by measuring the distance of the object in the image utilizing, for example, "Stereo Vision" which calculates the distance of the object from the disparity of two cameras or "Laser Range Finder" which calculates the distance by radiating a laser and then measuring the time period until the reflection light is detected.

Alternatively, in such a case that the image input unit 11 is configured with a camera and the camera is fixed, the background in the image picked up by the camera varies little. In such a case, it may also be extracted using the background differencing technique. That is, a method can be employed that detects a silhouette of a person in the picked-up image by using the background differencing technique, which takes a difference between a background image that is picked up and kept in advance where only a background is picked up without including a person and the image from the image input unit 11. In this case, an even more accurate extraction can be expected by using the information of the moving object extracted in the differencing process between the frames.

Alternatively, the silhouette of the person in the picked-up image can be detected more accurately when using a method of employing Graph Cut and Stereo Vision ("Bi-Layer segmentation of binocular stereo video" V. Kolmogorov, A. Blake et al. Microsoft Research Ltd., Cambridge, UK).

Figure 2:
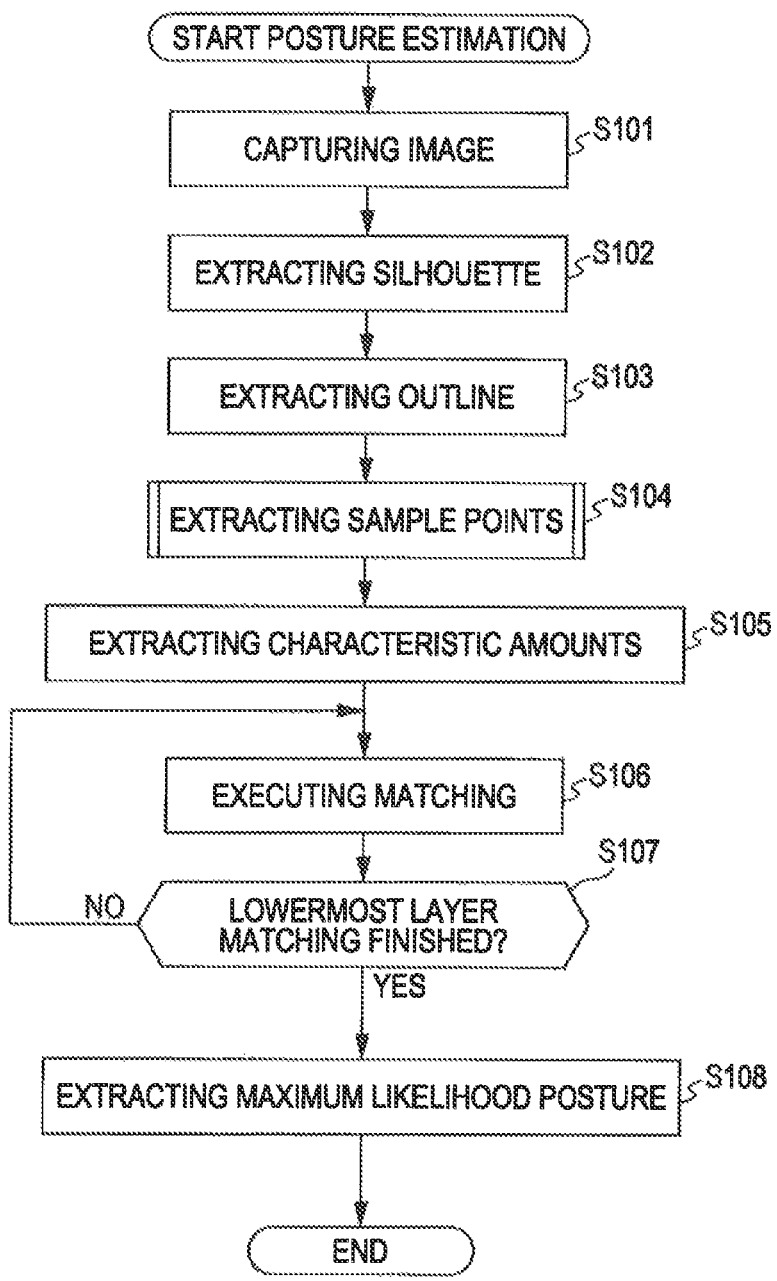
FIG. 2 is a flowchart illustrating processes relating to estimation of a posture.

Coming back to the description for the processes of the flowchart in FIG. 2, in step S103, the silhouette image extracted by the silhouette extraction unit 12 is delivered to the outline extraction unit 13 to extract the outline in the outline extraction unit 13. That is, the outline extraction unit 13 carries out a process of extracting the outline from within the silhouette image delivered from the silhouette extraction unit 12. Since the silhouette image is already binarized, the outline is obtained by extracting the edge. It is possible to apply, for example, a first derivation technique (Sobel operator, Roberts operator), Laplacian of Gaussian, Canny technique, or the like to the approach for the edge extraction. Here, the outline is given to be extracted from the silhouette image using Laplacian of Gaussian to continue the description.

Figure 5:
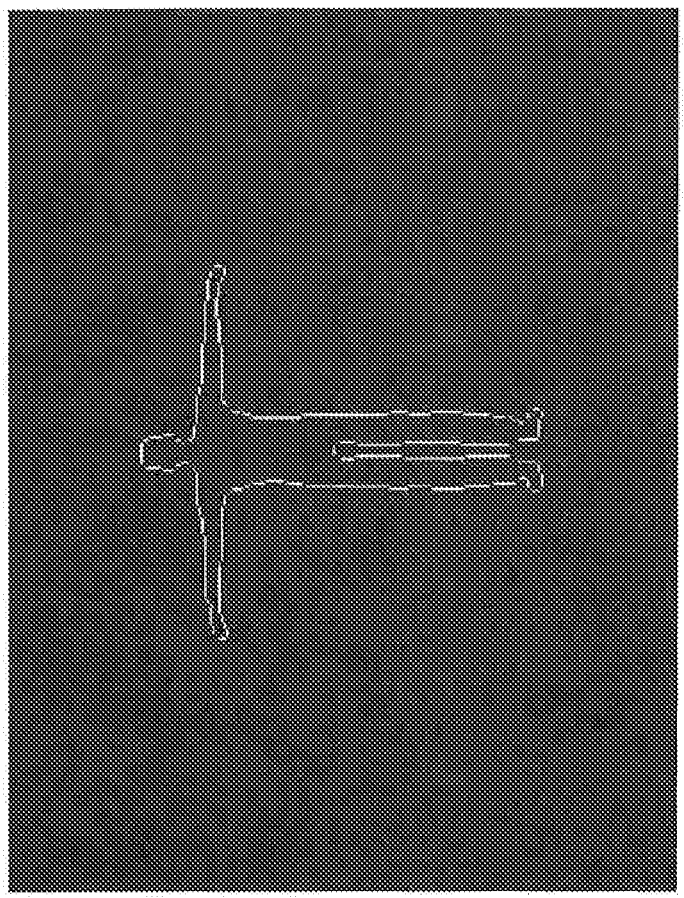
FIG. 5 illustrates an example of an outline image.

FIG. 5 illustrates an example of the outline image generated from the silhouette image by the outline extraction unit 13. The outline image is, same as the silhouette image, a binarized image in which a pixel value of each pixel is binarized to 0 or 1. The outline of the person in the outline image is represented by white pixels that indicate a pixel value of 0, while the background and the parts excluding the outline of the person in the outline image are represented by black pixels that indicate a pixel value of 1.

Coming back to the description for the processes of the flowchart in FIG. 2, the outline image generated by the outline extraction unit 13 in step S103 is delivered to the characteristic amount extraction unit 14. The characteristic amount extraction unit 14 extracts a predetermined characteristic amount from the delivered outline image. To extract the characteristic amount, sample points are extracted in step S104 and characteristic amounts at the extracted sample points are extracted in step S105. Firstly, a description is given to the process relating to the extraction of the sample points carried out in step S104.

The sample points are extracted in a certain number from the outline image. As the method of extracting a certain number of sample points from an outline image, there is a method, for example, of extracting evenly one-dimensionally by defining the number of steps as:

(Total number of points making up outline)/(desired number of sample points) and by sampling per number of steps from the predetermined points (pixels) making up the outline. Although such a method may be used, a description is given here to another method with reference to the flowchart in FIG. 3.

In step S121, the distances among all points making up the outline are calculated. For the distances, it is possible to use the Euclidean distance, for example. Next, in step S122, the minimum distance is detected among the distances. Then, in step S123, one of the two points making up the minimum distance is deleted. For example, a point is eliminated by temporarily storing data of the point and then deleting the data of one of the two points making up the minimum distance from the temporarily stored data. When there are a plurality of candidates for the point to be eliminated in this way, any of the points is selected and eliminated.

In step S124, the distance data configured with the eliminated point is eliminated (cleared). In step S125, it is determined whether or not the number of remaining points becomes a desired number of sample points. In a case that the number of remaining points is not determined as the desired number of sample points in step S125, the process goes back to step S122 and the processes after that are repeated. On the other hand, in a case that the number of remaining points is determined as the desired number of sample points in step S125, the process goes back to step S105 (FIG. 2) to carry out the processes after that.

By extracting the sample points used to extract the characteristic amount in such a manner, it becomes possible to extract the sample points evenly two-dimensionally. That is, although the sample points are concentrated in the area in which the outline is complex in the above extraction technique with a constant number of steps, this method can prevent such a phenomenon that the sample points come to be concentrated.

A further description is given below with an example of extracting a shape context characteristic amount as such a characteristic amount, and by extracting sample points based on the processes of the flowchart shown in FIG. 3, an improvement of the descriptive power of the shape context characteristic amount is obtained and it becomes possible to improve the accuracy of the estimation result. Although not explained here, such a fact is substantiated as a result of an experiment by the applicant of the present invention.

Figure 3:
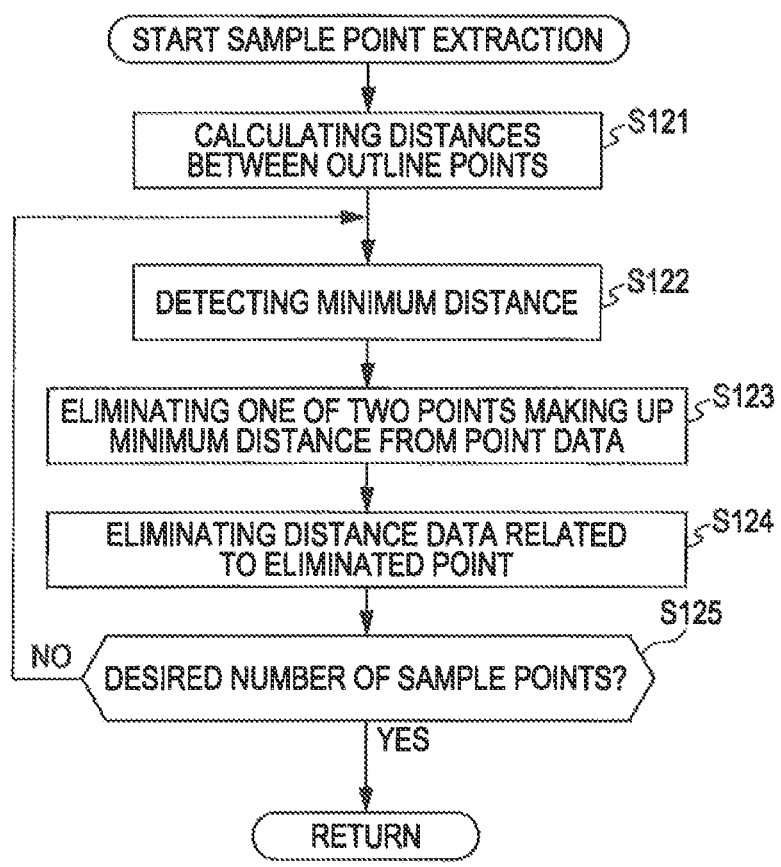
FIG. 3 is a flowchart illustrating processes relating to extraction of sample points.

When the distances between the points are calculated in step S121 to extract the sample points on the basis of the processes of the flowchart shown in FIG. 3, it is desirable to perform as many calculations as the square of the number of points. Therefore, in a case of a large number of points making up the outline, it is considered to result in an increase in the amount of calculation. In order to prevent the amount of calculation from being increased, sample points in several folds of the desired number of sample points are firstly made to be extracted in a certain number of steps. To the result of the extraction, the method using the distances from each other described with reference to the flowchart in FIG. 3 may also be applied to capture the finally desired sample points.

After thus extracting the sample points, in step S105 (FIG. 2), the characteristic amount extraction unit 14 extracts the characteristic amount from the outline image using the sample points. Here, the shape context characteristic amount is given to be extracted as the characteristic amount as described above to continue the description.

The characteristic amount extraction unit 14 extracts the sample points from the outline image delivered from the outline extraction unit 13 as described above, and then generates a shape context characteristic amount (referred to below as a shape context characteristic amount of the outline) configured with a plurality of histograms representing the characteristics of the outline configured with the sample points.

Details of the method of generating the shape context characteristic amount are described with reference to FIG. 6. A more detailed method of generating the shape context characteristic amount is described in, for example, "Matching with shape contexts" (IEEE Workshop on Content based Access of Image and Video Libraries, 2000).

Figure 6:
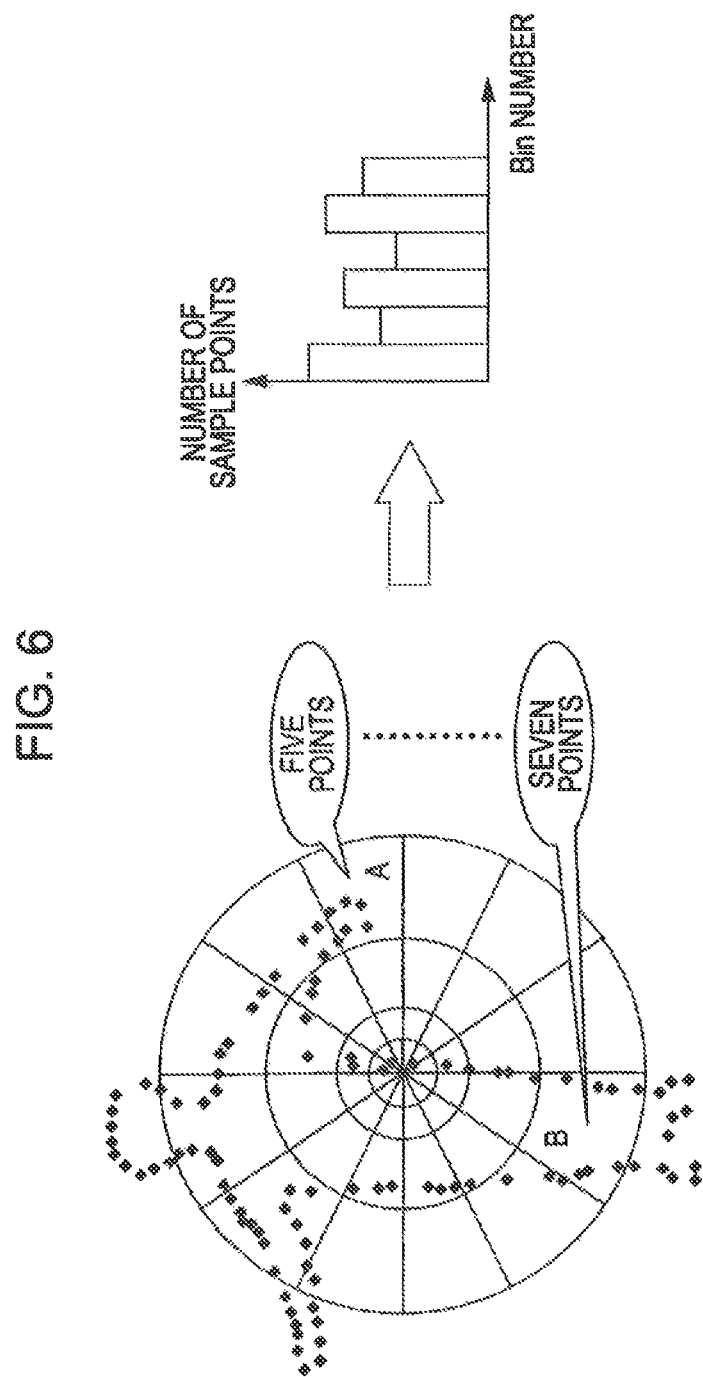
FIG. 6 illustrates how a characteristic amount is extracted.

On the left side of FIG. 6, there are shown a plurality of concentric circles with the center of a predetermined white pixel (sample point) being part of the outline and a plurality of regions in a generally sectorial form formed by being surrounded by lines radially extended from the predetermined white pixel.

On the right side of FIG. 6, a histogram is shown that is defined by a horizontal axis and a vertical axis, where the horizontal axis indicates a Bin number representing the plurality of regions respectively and the vertical axis indicates the number of sample points, making up the outline, which exist in the region of a corresponding Bin number.

The characteristic amount extraction unit 14 sequentially focuses the sample points making up the outline from the outline extraction unit 13. Then, histograms are generated from the plurality of regions, as shown on the left side of FIG. 6, formed with the focused sample point as the center. The characteristic amount extraction unit 14 delivers the plurality of histograms obtained in the number of focused sample points making up the outline as the shape context characteristic amount of the outline to the matching unit 15.

For example, in a case that the number existing in a region A is five as shown on the left side of FIG. 6, the characteristic amount extraction unit 14 determines the number of sample points corresponding to the Bin number representing the region A as five points, and in a case that the number existing in a region B is seven, it determines the number of sample points corresponding to the Bin number representing the region B a~seven points to generate such a histogram as shown on the right side of FIG. 6. Then, the histogram is delivered to the matching unit 15 as the shape context characteristic amount.

A further description is given to a procedure of extraction processing of a shape context characteristic amount carried out by the characteristic amount extraction unit 14. The characteristic amount extraction unit 14 focuses a predetermined pixel among the sample points making up the outline in the outline image from the outline extraction unit 13 to regard it as a focus pixel. Then, the characteristic amount extraction unit 14 establishes a plurality of regions in a generally sectorial form as shown on the left side of FIG. 6 in correspondence with the focus pixel.

By detecting the sample points included in the region for each of the plurality of established regions, such a histogram as shown on the right side of FIG. 6 is generated. The characteristic amount extraction unit 14 determines whether or not all sample points making up the outline are treated as focus pixels, and in a case of determining as not all the sample points are treated as focus pixels yet, the processes described above are repeated by giving a sample point not yet treated as a focus pixel to be a new focus pixel. Therefore, in a case that there are, for example, 100 sample points, 100 histograms are generated.

Then, in a case of determining that all the sample points making up the outline are treated as focus pixels, the characteristic amount extraction unit 14 regards the plurality of histograms obtained in the number of focused sample points making up the outline as the shape context characteristic amount of the outline.

Figure 7:
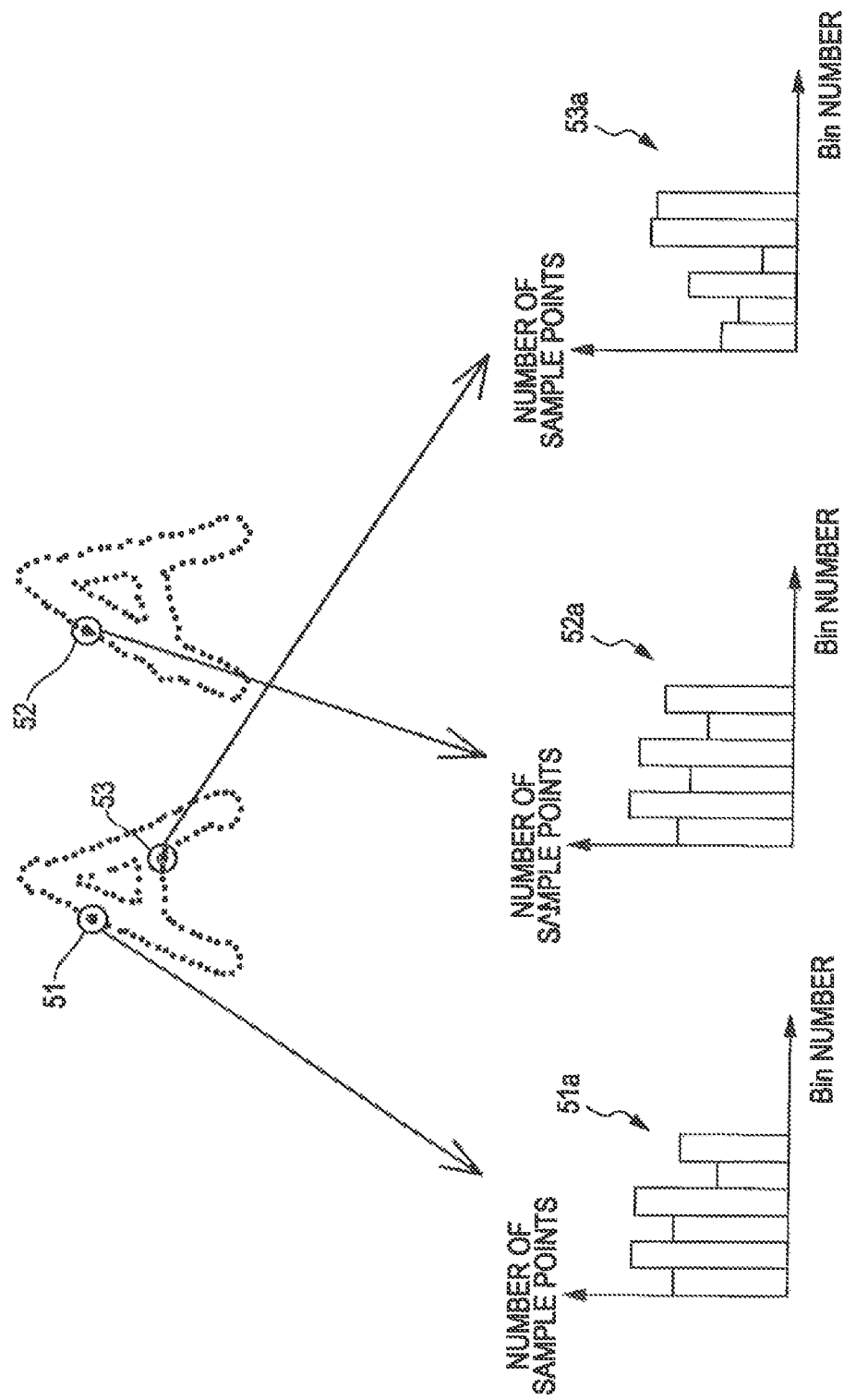
FIG. 7 illustrates how the characteristic amount is extracted.

With reference to FIG. 7, it is described that a predetermined histogram making up the shape context characteristic amount uniquely represents the characteristics of part of a line, such as the outline. On the upper left side and the upper right side of FIG. 7, outline pixels are illustrated respectively that are the pixels showing an outline as tracing the outline of a Roman character "A".

Since either of a region 51 of "A" on the upper left side of FIG. 7 and a region 52 of "A" on the upper right side of FIG. 7 is a region in which a line exists that is configured with a plurality of outline pixels extending from the diagonal upper right towards the diagonal lower left, the region 51 and the region 52 are the regions similar to each other.

In this case, as shown on the lower side of FIG. 7, it is found that a histogram 51a obtained from the region 51 and a histogram 52a obtained from the region 52 are similar to each other. Since a region 53 of "A" on the left side of FIG. 7 is a region in which a line exists that is configured with a plurality of outline pixels extending from the left towards the right, it is a region completely different from the regions 51 and 52. In this case, as shown on the lower side of FIG. 7, it is found that a histogram 53a obtained from the region 53 and the histogram 51a obtained from the region 51 (the histogram 52a obtained from the region 52) are different from each other.

As shown in FIG. 7, in a case that graphics (arrangements of outline pixels) existing in a region are similar to each other, the histograms obtained from the region are also similar to each other, and in a case that graphics existing in a region are not similar to each other, the histograms obtained from the region are also not similar to each other. Accordingly, a histogram obtained from a region uniquely expresses the graphic existing in the region.

The characteristic amount extraction unit 14 thus extracts the shape context characteristic amount from the outline image to deliver the shape context characteristic amount to the matching unit 15. The matching unit 15 carries out a matching in step S106 (FIG. 2). The matching unit 15 carries out the matching by comparing the shape context characteristic amount stored in the posture memory unit 16 and the shape context characteristic amount from the characteristic amount extraction unit 14.

In the posture memory unit 16, a type of characteristic amount same as the characteristic amount extracted in the characteristic amount extraction unit 14, that is, a shape context characteristic amount in this case is stored in advance. The shape context characteristic amount is extracted individually from a plurality of model posture images in which a plurality of postures are picked up. Further, the shape context characteristic amount is managed in a database of a tree structure as described later.

The matching unit 15 carries out a process of a characteristic amount matching that calculates a degree of matching the shape context characteristic amount of the outline from the characteristic amount extraction unit 14 and the shape context characteristic amount of a model posture image stored in the posture memory unit 16 for each of the plurality of model posture images (degree of matching the shape context characteristic amounts) to calculate a degree of matching the shape context characteristic amounts obtained for each of the plurality of model posture images by the characteristic amount matching process.

That is, the matching unit 15 determines a histogram obtained at an xth sample point when, for example, sequentially putting the sample points making up the outline in order of raster scan and a histogram obtained at an xth pixel when sequentially putting the pixels making up ~he model posture image in order of raster scan. Then, an evaluation is made using a chi-square distance of each number of sample points of the Bin numbers corresponding to the histogram obtained at the xth sample point among the sample points making up the outline and the histogram obtained at the xth pixel among the pixels making up the model posture image to regard an integrated value of the distance as the cost between the shape context characteristic amounts.

A chi-square distance $x^2$ between histograms P(k) and Q(k) having each Bin number of k is obtained by the following formula (1).

$$X^2 = \sum_{K=1}^{K} \frac{(P(k) - Q(k))^2}{P(k) + Q(k)} \quad (1)$$

For example, the histogram P(k) is a histogram at a sample point being part of the outline, and the histogram Q(k) is a histogram of a pixel being part of the model posture image.

As a method of evaluating the matching degree between the histograms, it is possible to use various standards other than the chi-square distance, such as the KL divergence, the Bhattacharyya distance. In a case of using the KL divergence (Kullback-Leibler information), a distance $D_{PQ}$ from the histogram P(k) to the histogram Q(k) is obtained by the following formula (2).

$$D_{PQ} = \sum_{K=1}^{K} P(k) \log \frac{P(k)}{Q(k)} \quad (2)$$

When the integrated value of the distance is regarded as the shape context characteristic amount, a cost minimization algorithm, such as the Hungarian Method, may also be used for calculation. The Hungarian Method is an approach to obtain a combination of sample groups for a minimum integration cost in a case that there are certain biserial samples and a cost calculated by a function of some sort between the sample groups.

For example, the matching unit 15 calculates the degree of matching the shape context characteristic amounts for each of all combinations when matching the sample points making up the outline and the pixels making up the model posture image respectively on one-to-one basis. Then, the matching unit 15 calculates the minimum value among the degree of matching the shape context characteristic amounts calculated for each of all the combinations using a cost minimization algorithm, such as the Hungarian Method, for example, to employ as the final degree of matching the shape context characteristic amounts.

In this case, in comparison with a case of, for example, matching the sample points making up the outline and the pixels making up the model posture image in order of raster scan or the like on one-to-one basis, a more appropriate degree of matching the shape context characteristic amounts can be calculated. In this case, however, when there are 100 sample points, for example, the shape context characteristic amount is calculated by comparing 100 histograms for the respective sample points making up the outline and histograms for 100 pixels making up the model posture image. That is, in this case, operations are carried out in 100×100, totally ten thousand times.

In a case that a posture estimated by applying the present embodiment is, for example, a posture of a human being, there is a very high possibility that the head of the subject in the image to be a processing object is on the upper side in the image and the feet are on the lower side. Therefore, it is considered that operations do not make much sense because of the long distance when comparing, for example, a histogram of a sample point making up the outline of the head part and a histogram of the model posture image making up the outline of the foot.

In order to reduce the amount of calculations, an approach may also be used that fixes the sequence of the sample points in accordance with a certain rule to regard an integration of a distance between preset corresponding points as the cost. The applicant of the present invention has confirmed that the accuracy of the estimation does not decrease even when reducing the amount of calculations using this approach. It is also confirmed that the throughput is remarkably improved by reducing the amount of calculations. Here, a further description is given to this approach. For example, a sample point at the highest position (upper position) in the outline image is given as a starting point. When omitting such a situation of raising the hand, the sample point at the highest position in the outline image is a point positioned at the top position of the head. By comparing a histogram of such a sample point and, for example, 100 histograms at 100 points making up a model posture image, the distances are calculated and evaluated to use an integrated value of the distances as a cost between the shape context characteristic amounts.

In this way, a cost may be calculated using only a histogram of a sample point of the outline at a predetermined position in the image. However, there is a possibility of not being able to keep the accuracy by only one point, so that the sample points at the back and front of the sample point regarded as the starting point are also included in the comparison.

For example, five sample points positioned on the right side of the starting point and five sample points positioned on the left side are given as further comparison. That is, by respectively comparing eleven histograms at the eleven points including the starting point among the sample points in the outline image and, for example, 100 histograms at 100 points making up the model posture image, the distances may also be calculated and evaluated to use an integrated value of the distances as a cost between the shape context characteristic amounts. In such a case, although operations are carried out in 11×100, totally 1100 times, it is understood that the number of operations can be remarkably reduced compared to the above ten thousand operations.

The sample point to be a starting point is not limited to the sample point positioned at the highest position in the outline image, but may be a sample point positioned at a predetermined position. For example, the sample point positioned at the upper left corner may also be a starting point. The plurality of sample points including such a starting point may be the sample points positioned at the left and right of or the above and below the starting point. In other words, the sample points are used which are positioned in the vicinity of the starting point.

Even such an approach with a reduced amount of operations can carry out estimation of a posture without dropping the accuracy of estimation in a particular case of a subject being a person or the like and also a case of such an image having a certain rule for the position of the head or the like in the image.

Figure 8:
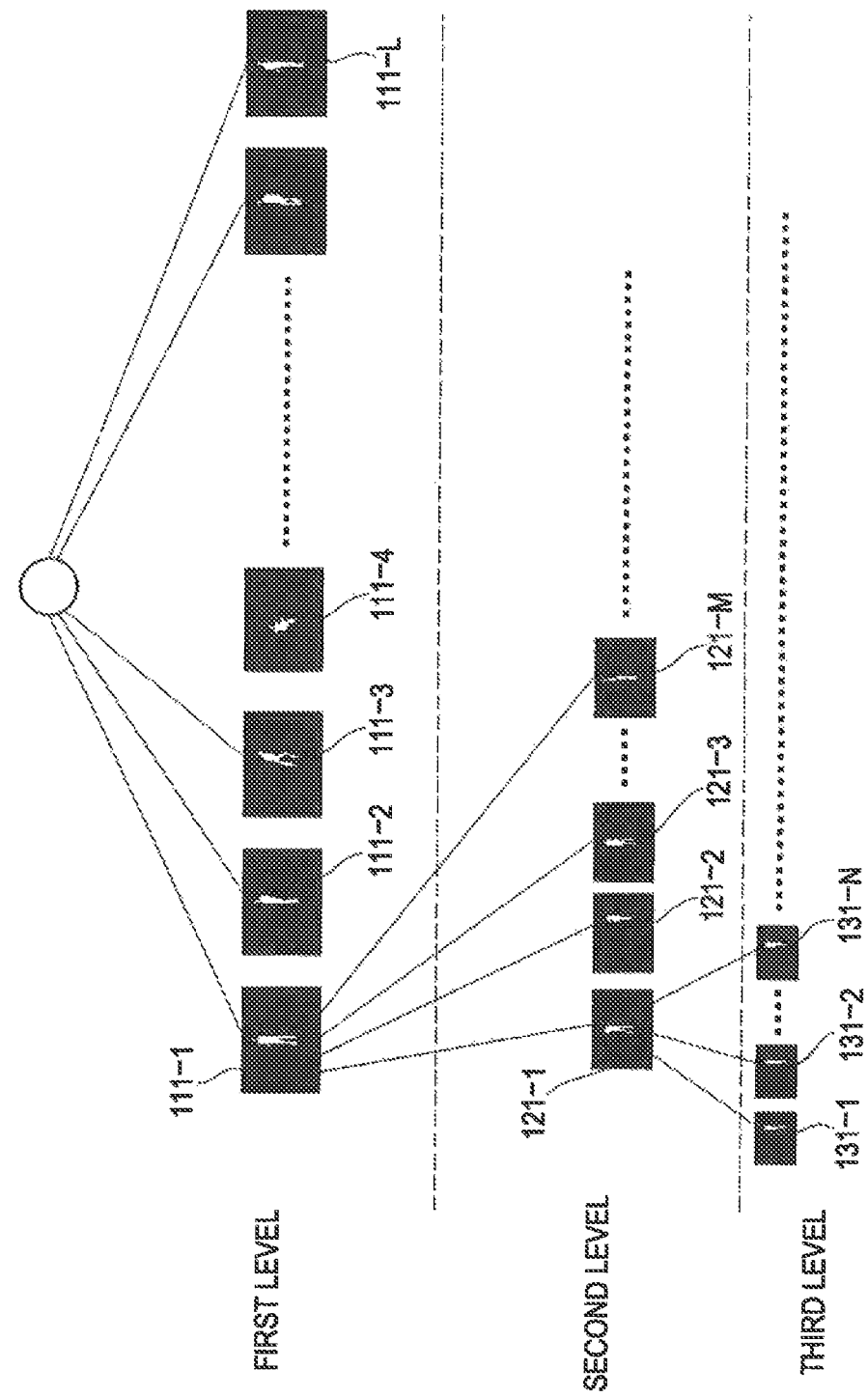
FIG. 8 illustrates model posture image groups of a tree structure.

A further description is continuously given to the manner of estimating a posture that reduces the amount of operations without dropping the accuracy of estimation. The matching unit 15 carries out matching for each of the model posture images stored in the posture memory unit 16. Here, a description is given to groups of model posture images stored in the posture memory unit 16. FIG. 8 illustrates an example of groups of model posture images stored in the posture memory unit 16.

The model posture images are managed in a database of a tree structure. FIG. 8 illustrates an example of the database of a three-lever tree structure having a first level through a third level. The first level is configured with L pieces of images of model posture images 111-1 through 111-L. The model posture image 111-1 in the first level is associated with M pieces of images of model posture images 121-1 through 121-M being part of the second level. Similarly, the model posture image 121-1 in the second level is associated with N pieces of images of model posture images 131-1 through 131-N being part of the third level.

The model posture images 121-1 through 121-M associated with the model posture image 111-1 are images of postures similar to (derived from) the model posture image 111-1. The model posture images 131-1 through 131-N associated with the model posture image 121-1 are images of postures similar to the model posture image 121-1. In other words, a deeper level (in the direction from the first level towards the third level) has an image showing a posture in more detail.

The example illustrated in FIG. 8 is an example, and the tree structure may have a structure in which postures in a close distance belong to a same branch according to some sort of standards. It is possible to construct a group of model posture images configured with such a tree structure by, for example, repeating database clustering in each level. In addition, various approaches can be considered, such as a top-down type constructing from the upper layers and a bottom-up type constructing from the lower layers.

As an example, the distances between each posture is obtained using a two-dimensional coordinate of each joint of the subject (model) in the model posture image to regard the distances as the standards. Then, using a clustering approach to approximate initial clusters configured using the LBG algorithm to the Gaussian Mixture Model using the EM algorithm, a posture closest to the average value of each cluster is regarded as a representative posture of the cluster and as one of the branches in the level. The tree structure is constructed by repeating such a process.

By carrying out estimation using groups of model posture images in such a tree structure in the present embodiment, significant speedup is achieved compared to full search. Here, suppose that full search were carried out for all the model posture images making up the tree structure' illustrated in FIG. 8. In a case of full search, there is no reason to make a tree structure. In addition, as an assumption, the number of the model posture images 121 making up the second level associated with one of the model posture images 111 being part of the first level were M pieces, and the number of the model posture images 131 making up the third level associated with one of the model posture images 121 being part of the second level were N pieces. In such a case, the full search is carried out for the model posture images of (L×M×N) pieces.

In contrast to full search, since a search using the groups of model posture images of the tree structure illustrated in FIG. 8 carries out the following processes, the model posture images for the search can be dramatically reduced in contrast to those for full search. That is, the search is first carried out for, for example, L pieces of the model posture images 111-1 through 111-L making up the first level. The next search is carried out for M pieces of the model posture images 121-1 through 121-M in the second level associated with, for example, the model posture image 111-1, which turns out as the minimum cost among the model posture images 111-1 through 111-L.

Then, the next search is carried out for N pieces of the model posture images 131-1 through 131-N in the third level associated with, for example, the model posture image 121-1, which turns out as the minimum cost among the model posture images 121-1 through 121-L. Then, for example, the model posture image 131-1, which turns out as the minimum cost among the model posture images 131-1 through 131-N is output as an estimation result.

By sequentially searching the model posture images from the first level to the third level in such a manner, the number of the model posture images for the search turns out to be (L+M+N) pieces. Therefore, the search can be carried out with (L+M+N) pieces much less than the (L×M×N) pieces for the full search. Therefore, as described above, it becomes possible to speed up the process by using groups of model posture images of a tree structure.

The matching unit 15 carries out matching in step S106 (FIG. 2) as described above. Therefore, since matching is carried out for each level, whether or not the matching is finished until the lowermost layer is determined in step S107. That is, in a case of a three-level tree structure as illustrated in FIG. 8, the search objects until the model posture images 131 in the third level and matching is carried out to determine in step S107 whether or not a piece of the minimum cost is determined among the model posture images 131.

In step S107, in a case of being determined that the process is not finished matching until the lowermost layer, the processes of step S106 and after that are repeated by moving in the next level. On the other hand, in a case of being determined that the process is finished matching until the lowermost layer in step S107, the process is forwarded to step S108. In step S108, a maximum likelihood posture is extracted.

That is, the matching unit 15 estimates that the posture represented by a model posture image corresponding to the cost of a shape context characteristic amount having the maximum degree of matching (minimum cost) among the plurality of model posture images, for example a model posture image corresponding to the minimum degree of matching the shape context characteristic amounts among the plurality of degrees of matching the shape context characteristic amounts as the posture of the subject in the image input to the image input unit 11 to output the estimation result.

What is output as the estimation result is data related to the positions of the joints in the model posture image determined as the minimum cost. The description above has explained that groups of the model posture images of such a tree structure illustrated in FIG. 8 are stored in the posture memory unit 16; specifically, coordinates of sample points, characteristic amounts (histograms) for each of the sample points, and positions of the joints are stored for each model posture image. For example, in the model posture image 111-1, the coordinates of the sample points extracted from the model posture image 111-1, the characteristic amounts obtained respectively from the sample points, and the positions (coordinates) of the joints of the subject of the model posture image 111-1 are stored as the model posture image 111-1.

Then, as a result of the estimation, in a case that the result of comparing with the characteristic amount of the model posture image 111-1, for example, is determined as the minimum cost, the data of the positions of the joints in the model posture image 111-1 is output as data of the estimated posture to a processing unit in a later stage.

By thus estimating the posture of the subject in the input image by combining the shape context characteristic amounts, which are resistant to noises and scale changes, and the database of a tree structure, the estimation can be carried out accurately and fast. Here, an example of the estimation result is shown in FIG. 9.

Figure 9:
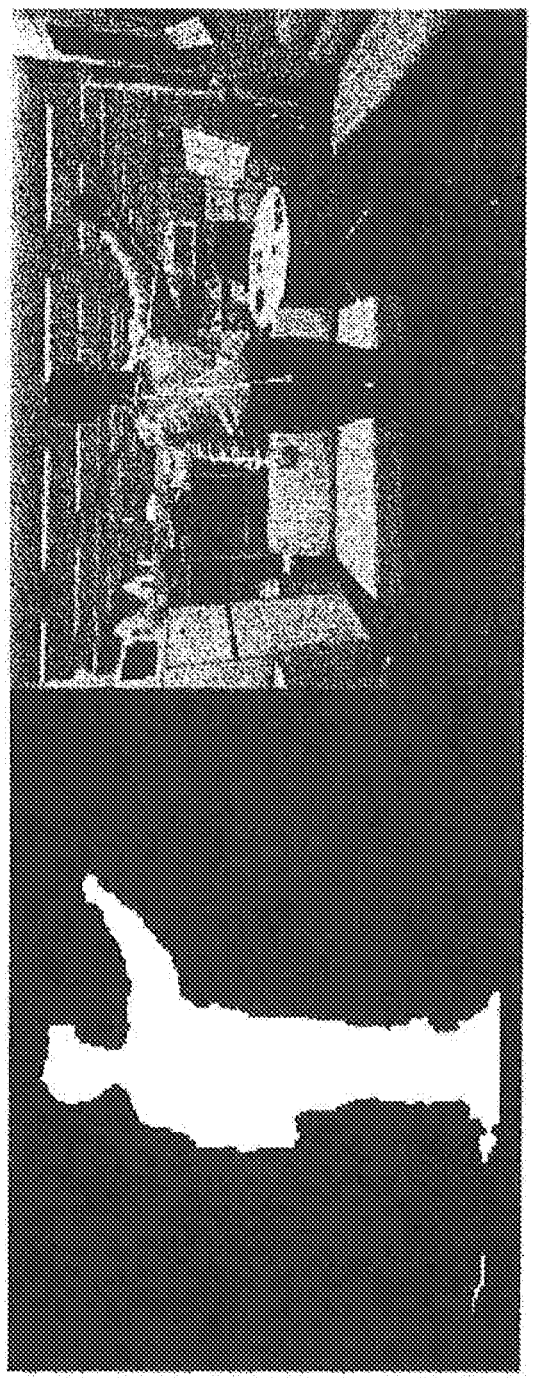
FIG. 9 illustrates an example of an estimation result.

What is shown on the left side of FIG. 9 is a silhouette image generated from an input image, and the white part in the center is the image at the time of extracted as the silhouette of the subject. What is shown on the right side of FIG. 9 is an image in which the input image and the estimation result are overlapped. In the image illustrated on the right side of FIG. 9, the points and lines illustrates the estimated positions of the joints. It can be confirmed from the image on the left side of FIG. 9 that the posture of the subject in the image and the positions of the estimated joints match with each other and that the posture of the subject in the image can be accurately estimated.

Since the posture is estimated as described above, the subject itself in the image can be simply picked up in an image without putting on markers or the like. Therefore, it becomes possible to perceive a posture of a person without placing a burden on a subject (user) and also without any special environment. Therefore, application of this embodiment of the present invention facilitates estimation of gestures and the like of a user even, for example, in an ordinary household or the like and so development to applications, for example, utilized in ordinary households and the like is facilitated.

Another Embodiment—Determining Accuracy of Estimation

By estimating a posture as described above, estimation of a person's posture can be carried out without any special environment. For example, in such a case of using an estimation result as an initial position for tracking a position of each joint of a person, it is desirable to have a considerable quality in the estimation accuracy. In case that an initial position for tracking a position of each joint happens to use an estimation result turned out to be of low accuracy, there is a high possibility that the initial position itself is wrong, and therefore there is a possibility not to be able to accurately carry out the processes afterwards.

By determining the accuracy of the estimation result, it becomes possible to determine, for example, whether or not to use as an initial position for tracking the position of each joint as described above based on the result of the determination. By determining the accuracy of an estimation result, the processes in the later stages using the result are arranged not to be carried out when determined as low in accuracy, thereby it becomes possible to carry out a process with accuracy regularly kept at a certain quality or above.

Figure 10:
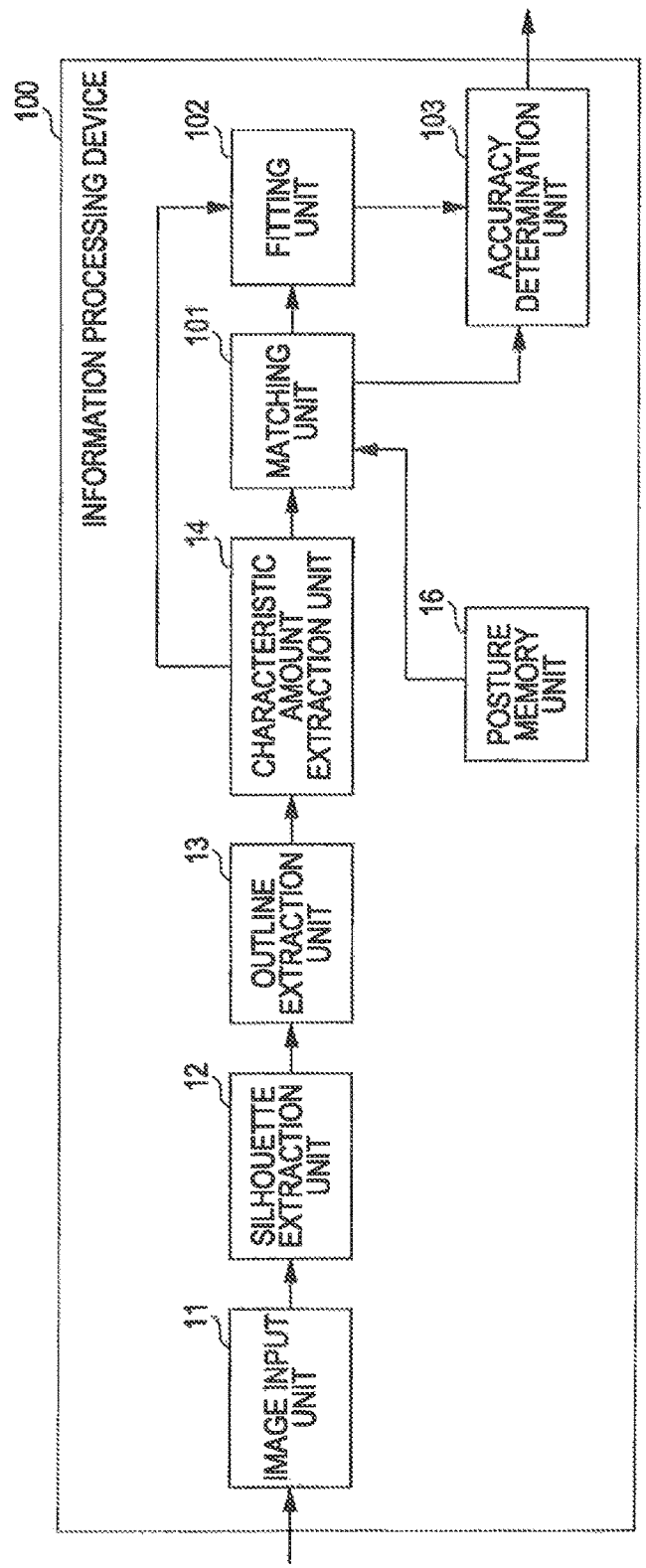
FIG. 10 illustrates a configuration of an information processing device to which another embodiment of the present invention is applied.

In a case of carrying out such determination, an information processing device 100 having a configuration as illustrated in FIG. 10 is prepared by adding a fitting unit 102 and an accuracy determination unit 103 to the information processing device 10 in FIG. 1. The information processing device 100 illustrated in FIG. 10 is configured by adding the fitting unit 102 and the accuracy determination unit 103 to the information processing device 10 illustrated in FIG. 1, and the configuration other than them is identical to that of the information processing device 10 illustrated in FIG. 1, so that identical reference numerals are assigned to omit the description. However, since the matching unit 15 shown in FIG. 1 and a matching unit 101 shown in FIG. 10 include different processes, the different reference numerals are assigned to them.

In the information processing device 100 illustrated in FIG. 10, the accuracy of the posture estimated in the matching unit 101 is determined by the fitting unit 102 and the accuracy determination unit 103. In the information processing device 100, estimation of a posture is carried out by carrying out the processes as described above and the estimation result is output from the matching unit 101, and at that time, the cost for matching the shape context characteristic amounts of the posture and the input image is output as well as the maximum likelihood posture.

From the matching unit 101 to the fitting unit 102, data of the positions of joints in the maximum likelihood posture and data of sample points are delivered. In addition, data of the sample points of the input image is delivered from the characteristic amount extraction unit 14. In the fitting unit 102, a morphing method of Bookstein, for example, is used to carry out a process such that the data of the positions of the joints in the maximum likelihood posture is fit into the sample points of the input image. Then, using the fit data of the positions of the joints, the distances between the maximum likelihood posture and the sample points of the input image are calculated to be output.

The matching cost output from the matching unit 101 and the distances between the sample points output from the fitting unit 102 are input to the accuracy determination unit 103, and a discriminator that have learned in advance by Boosting carries out determination whether the estimation accuracy is fair or not to output the result.

Figure 11:
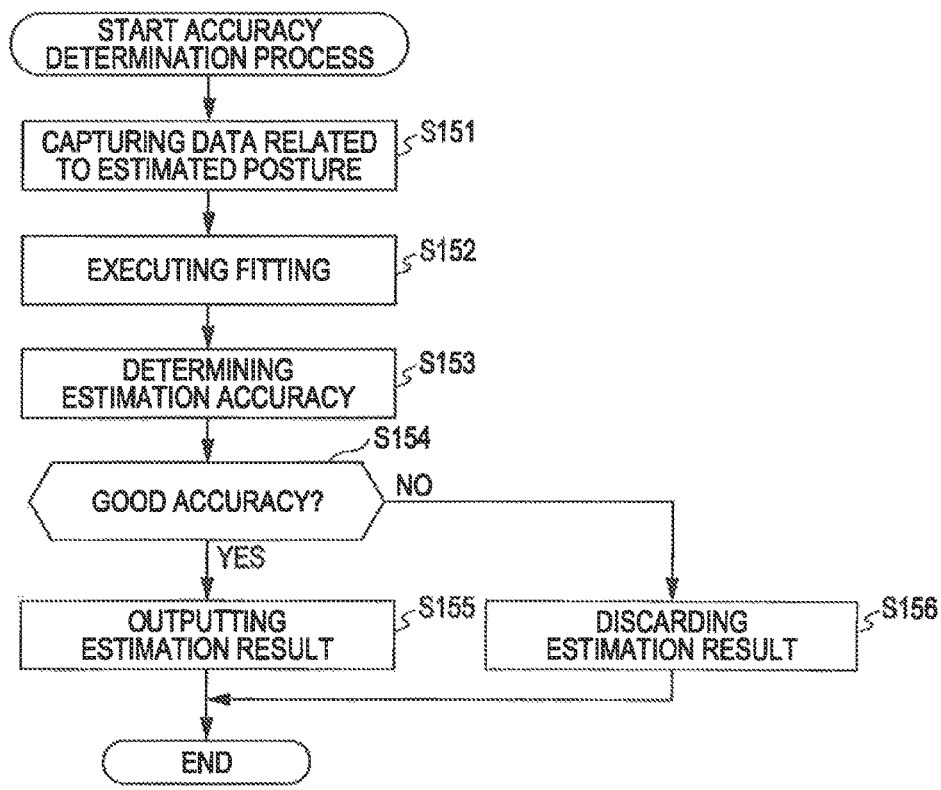
FIG. 11 is a flowchart to describe processes relating to determination of estimation accuracy.

Then, with reference to a flowchart in FIG. 11, a description is given to the processes for determining the accuracy of estimation. As a postulate to carry out the processes of the flowchart in FIG. 11, in the image input unit 11 through the matching unit 101, the processes described with reference to the flowcharts in FIGS. 2 and 3, that is, the processes relating to the estimation of posture in the embodiment described earlier are carried out to be in the condition possible to obtain the estimation result. Since the processes relating to the estimation are already described, the description is omitted here.

In step S151, the fitting unit 102 and the accuracy determination unit 103 capture the data related to the posture estimated from the matching unit 101. As described above, in the matching unit 101, matching is carried out between the shape context characteristic amount generated based on a certain number of the sample points extracted from the input image and the shape context characteristic amount of model posture groups generated in accordance with the same rule in advance to output a model posture with the lowest matching cost as the maximum likelihood posture.

This matching (matching carried out by the matching unit 15 shown in FIG. 1) is already described that the distances of "histograms in each of the sample points", which are the elements making up the shape context characteristic amounts, are used as the cost by calculated with some sort of standards (chi-square distance, for example) and integrated. However, the matching unit 101 does not integrate the individual results of histogram calculations in order to determine the accuracy of estimation, but the information processing device 100 illustrated in FIG. 10 directly outputs the results to the accuracy determination unit 103. Therefore, in a case that there are results of calculations with 100 histograms, for example, 100 operation results are output.

On the other hand, the matching unit 101 delivers data of the positions of the joints in the maximum likelihood posture and data of the sample points to the fitting unit 102. From the characteristic amount extraction unit 14 to the fitting unit 102, the data of the sample points in the input image is delivered.

In step S152, the fitting unit 102 carries out a process of fitting. The fitting unit 102 carries out a process of fitting the positional data (coordinates) of the sample points in the maximum likelihood posture delivered from the matching unit 101 into the positional data of the sample points in the input image using a morphing method. There exists an error between the posture of the model detected as the maximum likelihood posture and the posture in the input image, and in order to correct it, the process of fitting is carried out.

As the morphing method to be carried out by the fitting unit 102, a method can be used that is called for by Fred. L. Bookstein at the University of Michigan in "Principal Warps: Thin-plate Splines and the Decomposition of Deformations (IEEE Transaction on Pattern Analysis and Machine Intelligence, Vol. II, No. 6, June 1989)". According to this morphing method, a conversion matrix is obtained between the corresponding sample points, and the coordinates fit into the input image can be obtained by applying this matrix to the coordinates of the joints.

The fitting unit 102 calculates the Euclidean distances between the fit sample points and the corresponding sample points in the input image for each of the points to output the Euclidean distances to the accuracy determination unit 103.

In step S153, determination of the estimation accuracy is carried out in the accuracy determination unit 103. The accuracy determination unit 103 determines the quality of the accuracy based on the distances between the matching cost delivered from the matching unit 101 and the sample points delivered from the fitting unit 102. For the determination, a discriminator can be used that is built by supervised learning using a machine learning approach named Boosting. The Boosting is an approach of making up one strong discriminator by combining a plurality of weak discriminators named Weak Learners. There are various types existing due to the differences in learning methods and the like, and for example, an approach named AdaBoost, which is called for by Y. Freund et al. at AT&T in "A short Introduction to Boosting" (Journal of Japanese Society for Artificial Intelligence, 1999) can be applied to the embodiment of the present invention.

Figure 12:
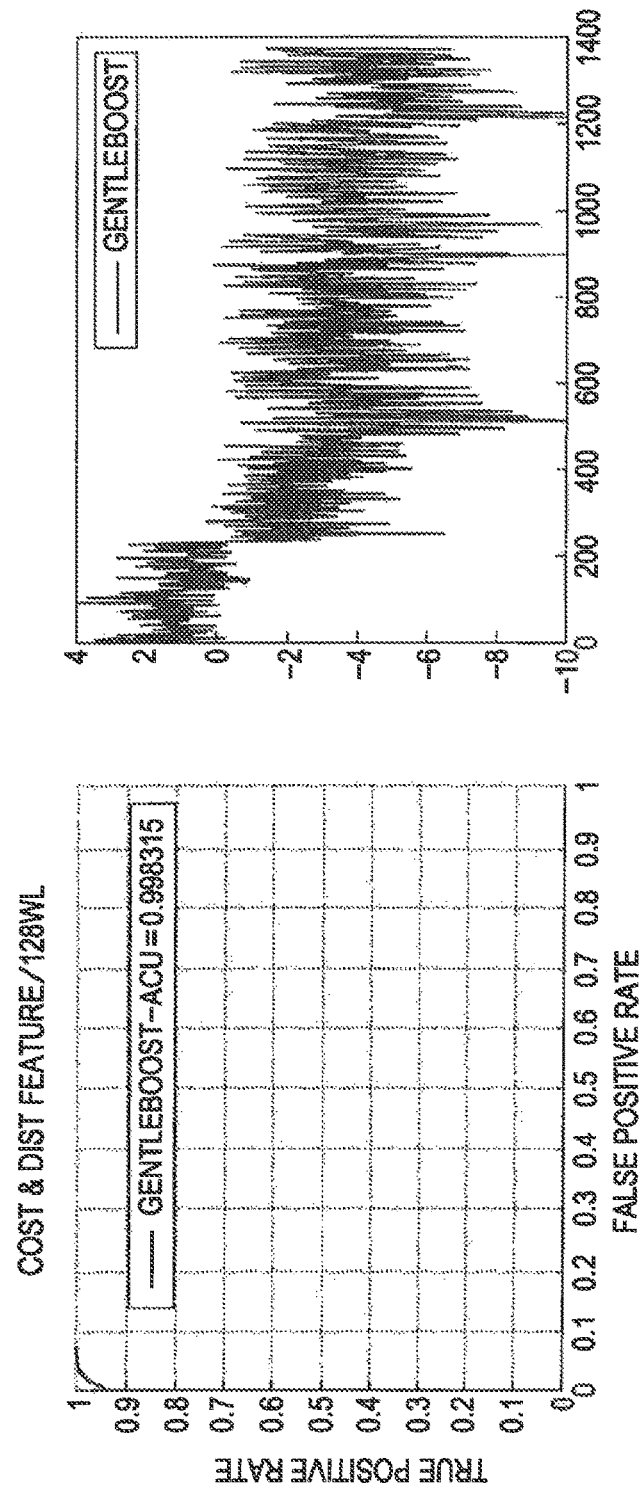
FIG. 12 illustrates performance evaluation.

Here, performance evaluation is shown in FIG. 12 in which the applicant of the present invention made up an accuracy determination unit 103 as described below and actually determined the accuracy. Firstly, the number of sample points was given as 100. In this case, the matching cost became 100-dimensional and the distances between the sample points became 100-dimensional, so that learning was carried out with the characteristic amounts of totally 200 dimensions. Then, approximately 200 pieces of positive sample images (with a good estimation result) and approximately 1200 pieces of negative sample images (with a not-good estimation result) were used for learning. As a result, a discriminator was generated with 128 Weak Learners and the accuracy determination unit 103 was configured with the discriminator.

As a result, a result of performance evaluation as shown in FIG. 12 was obtained. The graph on the right side in FIG. 12 has a horizontal axis, on which sample numbers are plotted, and a vertical axis, on which outputs of the discriminator are plotted; the first segment up to approximately the sample number 200 is the result of the positive samples and the remaining segment is the result of the negative samples. The graph illustrates that a positive output of the discriminator is determined as "good estimation accuracy" and a negative one is determined as "not-good estimation accuracy". The graph on the left side of FIG. 12 illustrates an ROC curve (receiver operating characteristic curve). As understood from the ROC curve, it is found that the discriminator have learned at a good level.

According to a result of the determination by the accuracy determination unit 103 configured with such a discriminator, whether the accuracy is fair or not is determined in step S153. That is, an output of the discriminator is evaluated in step S153 to be determined as "good estimation accuracy" when positive and determined as "not-good estimation accuracy" when negative. In step S154, whether or not the determination result has good estimation accuracy is determined.

In step S154, if it is determined that the estimation accuracy is good, the process is forwarded to step S155 and the estimation result from the matching unit 101 is output. If it is determined that the estimation accuracy is not good in step S154, in other words, if it is determined that the estimation accuracy is not good, the process is forwarded to step S156 and the estimation result is discarded without being output.

Although the above accuracy determination unit 103 is described that it determines the accuracy using the matching cost from the matching unit 101 and the distance data from the fitting unit 102, it may also determine the accuracy only with either one of the matching cost or the distance data. In a case of determining the accuracy only with the matching cost, the information processing device 100 has a configuration in which the fitting unit 102 is deleted. Here, the reason why the accuracy determination unit 103 is described to determine the accuracy using the matching cost from the matching unit 101 and the distance data from the fitting unit 102 is that enables to carry out the accuracy determination most accurately.

The accuracy of the estimation result is thus determined, and based on the result of the determination, the estimation result can be determined to be used or not to be used. Although such an example is given here, an alternative may also, for example, regularly output the estimation result itself regardless of the accuracy and a flag indicating the estimation result (accuracy) as well as the estimation result. It then may also be configuration in which whether or not to accept the estimation result can be determined on the side where it is output based on the condition of the estimation result.

Estimation of the posture may be further carried out again based on the condition of the accuracy. In other words, the information processing device 100 may also have a configuration of applying a feedback based on the condition of the accuracy.

When the accuracy of the estimation is determined to be low, the low accuracy may be considered to be caused by that the image determined to be a processing object is not appropriate to be a processing object. Then, a direction is given so as to apply a feedback to the image input unit 11 and capture an image again. Then, a silhouette image and the like may also be generated from the image captured again to carry out estimation of the posture. In a case of applying a feedback to the image input unit 11, not by capturing an image again but by adding a process, such as pixel interpolation, for example, to the image determined to be a processing object, a process, such as increasing the resolution, may also be added to process the image and a process may also be carried out to the processed image for estimating the posture again.

Alternatively, when the accuracy of the estimation is determined to be low, the low accuracy may be considered to be caused at the time of generation of the silhouette image in the silhouette extraction unit 12. Then, a feedback is applied to the silhouette extraction unit 12 to direct generation of a silhouette image again. The silhouette extraction unit 12 carries out, for the input image determined to be a processing object, such a process of generating a silhouette image again by using, for example, a threshold different from a previous threshold. Then, a process may also be carried out to the generated silhouette image for estimating the posture again.

Alternatively, when the accuracy of the estimation is determined to be low, the low accuracy may be considered to be caused at the time of generation of the outline image in the outline extraction unit 13. Then, a feedback is applied to the outline extraction unit 13 to direct generation of an outline image again. The outline extraction unit 13 carries out such a process of generating an outline image again using, for example, an approach for edge extraction different from a previous approach to the silhouette image determined to be a processing object. Then, a process may also be carried out to the generated outline image for estimation of the posture again.

Alternatively, when the accuracy of the estimation is determined to be low, the low accuracy may be considered to be caused by the extraction of the characteristic amounts in the characteristic amount extraction unit 14. Then, a feedback is applied to the characteristic amount extraction unit 14 to direct extraction of characteristic amounts again. The characteristic amount extraction unit 14 carries out a process, for the outline image determined to be a processing object, in which to, for example, extract a sample point different from a previous sample point, in step S123 (FIG. 3), for example, the data of a point different from the previously eliminated point is eliminated to eliminate one of the two points making up the minimum distance from the point data or a point is eliminated by selecting a paint that is not previously selected to select anyone from a plurality of candidates for elimination.

Alternatively, when the accuracy of the estimation is determined to be low, the low accuracy may be considered to be caused by the matching in the matching unit 101. Then, a feedback is applied to the matching unit 101 to direct matching again. To carry out matching again, the matching unit 101 carries out matching by applying an approach different from a previous matching approach. For example, when extracting characteristic amounts again after using a chi-square distance as an approach for evaluation of the similarity of histograms, a reevaluation may also be made by applying a different approach for evaluation, such as the KL divergence and the Bhattacharyya distance.

Alternatively, when the matching is configured to be carried out with less sample points for comparison in order to reduce the amount of operations, matching may also be carried out again with an increased number of sample points for comparison. For example, although eleven sample points are given for comparison in the example of the above embodiment, matching may also be carried out by further adding a plurality of sample points at the back and front (for example, two points each, totally four points) to the eleven points.

Alternatively, in a case of carrying out matching using groups of model posture images of the tree structure illustrated in FIG. 8, although a description is given that matching processes are carried out that is repeated until the model posture images in the lowermost layer in such a way that a model posture image with the minimum cost is selected from the model posture images making up the first level and then a model posture image with the minimum cost is selected from model posture images in the second level associated with the firstly selected model posture image, rematching is carried out by eliminating the model posture images selected until the previous time among the model posture images making up the first level.

For example, when matching is carried out again because of a low estimation accuracy for selecting the model posture image 111-1 being part of the first level, the model posture images 111-2 through 111-L making up the model posture image group in the first level, other than the model posture image 111-1, are the model posture images for matching. In a case of carrying out such processes, the model posture images with minimum costs in the three upper places, for example, may be stored in the first matching and the model posture image with a second minimum cost may undergo matching during rematching.

The process may also be carried out regularly to make the model posture images until the upper three places, for example, as the processing objects regardless of whether or not configured to apply a feedback. In other words, it may also have a configuration in which the minimum costs until the upper three places are output as the estimation postures when carrying out the first matching and the accuracy determination unit 103 selects one most likely posture among the estimation postures until the upper three places for output.

The part to which a feedback is applied may also be established depending on the installation site, the throughput, and the like of the information processing device 100.

Although the result of the determination of the estimation accuracy is described as whether the good estimation accuracy or the not-good estimation accuracy in the above embodiment, the result of the determination may also be, for example, a percentage (%) indicating the likelihood.

Thus, according to the embodiments of the present invention, not only estimation of a posture but also even the estimation accuracy can be determined. In addition, by determining such estimation accuracy, the estimation accuracy can be guaranteed and so a reliable initial value can be given even using the estimation result as an initial value for tracking a person. In addition, it becomes possible to be applied to various usages, such as applications using precise positions of the joints, for example, controllers for games and operation interfaces for manipulators.

[Recording Medium]

The series of processing described above can be carried out by hardware and also by software. In a case of carrying out the series of processing by software, a program making up the software is installed in a computer. Here, such a computer includes a computer built in hardware for an exclusive purpose, a—general purpose personal computer, for example, possible to carry out various functions by installing various programs, and the like.

Figure 13:
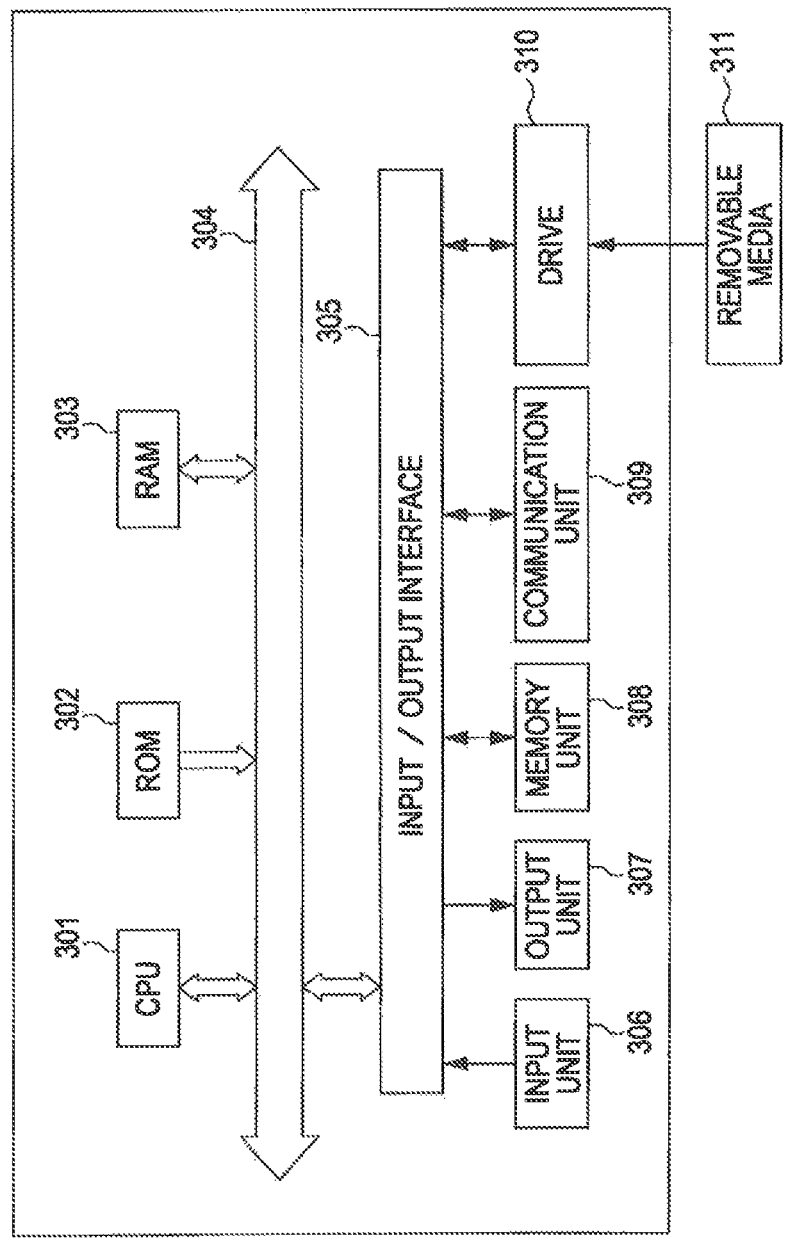
FIG. 13 illustrates a recording medium.

FIG. 13 is a block diagram illustrating an example of a hardware configuration of a computer that carries out the series of processing described above by a program. In the computer, a CPU (Central Processing Unit) 301, a ROM (Read Only Memory) 302, and a RAM (Random Access Memory) 303 are connected by a bus 304 with each other. The bus 304 is further connected to an input/output interface 305. The input/output interface 305 is connected to an input unit 306, an output unit 307, a memory unit 308, a communication unit 309, and a drive 310.

The input unit 306 is made with a keyboard, a mouse, a microphone, and the like. The output unit 307 is made with a display, a speaker, and the like. The memory unit 308 is made with a hard disk, a non-volatile memory, and the like. The communication unit 309 is made with a network interface and the like. The drive 310 drives a removable media 311, such as a magnetic disk, an optical disk, a magnetoptical disk, or a semiconductor memory.

In a computer configured as described above, the CPU 301 executes, for example, a program stored in the memory unit 308 via the input/output interface 305 and the bus 304 by loading in the RAM 303, thereby the series of processing described above are carried out.

The program executed by the computer (CPU 301) can be provided by being recorded in, for example, the removable media 311 as a packaged media or the like. The program can also be provided via a wired or non-wired transmission medium, such as a local area network, the internet, and digital satellite broadcasting.

In the computer, the program can be installed in the memory unit 308 via the input/output interface 305 by placing the removable media 311 in the drive 310. The program can also be received in the communication unit 309 via a wired or non-wired transmission medium to be installed in the memory unit 308. Besides, the program can be preinstalled in the ROM 302 or the memory unit 308.

The program executed by the computer may be a program in which the processes are carried out in time series according to the order in which the description is given herein or may also be a program in which the processes are carried out in parallel or at a desired timing, such as on call.

A system is defined herein to represent an entire apparatus configured with a plurality of devices.

The present application contains subject matter related to that disclosed in Japanese priority Patent Application JP 2009-018179 filed in the Japan Patent Office on Jan. 29, 2009, the entire content of which is hereby incorporated by reference.

Embodiments of the present invention are not limited to the embodiments described above, and various modifications may be possible without departing from the scope of the summary of the present invention.

The invention claimed is:

1. An information processing apparatus, comprising:
circuitry configured to:
obtain an image of at least a part of a human subject, the image being captured by an imaging device;
estimate a position of a joint of the human subject based on the obtained image, the joint being a place at which two parts of the human subject are joined;
output, using a plurality of points indicative of the estimated position of the joint, joint position data indicative of the estimated position of the joint and estimation accuracy data indicative of an accuracy of the estimated position of the joint based on an estimation result of the position of the joint; and
estimate a posture of the human subject based on the output joint position data and the output estimation accuracy data.

2. The information processing apparatus of claim 1, wherein
the estimation accuracy data is generated by a discriminator learned by a machine learning.

3. The information processing apparatus of claim 2, wherein
the discriminator is learned by Boosting.

4. The information processing apparatus of claim 1, wherein
the joint position data includes position information of a coordinate of the image data, and
the position information of the coordinate indicates two-dimensional coordinate of each joint of the human subject.

5. The information processing apparatus of claim 1, wherein
the estimation accuracy data includes a numerical value indicative of a likelihood of the estimation result.

6. The information processing apparatus of claim 1, wherein the circuitry is further configured to:
output a plurality of the joint position data for a plurality of the estimated positions of a plurality of the joints; and
estimate the posture of the human subject based on the output plurality of joint position data and the output estimation accuracy data.

7. The information processing apparatus of claim 1, wherein the circuitry is further configured to:
output the image of the at least a part of the human subject; and
overlap the plurality of points indicative of the estimated position of the joint on the image and a straight line between the plurality of points on the image.

8. The information processing apparatus of claim 1, wherein the circuitry is further configured to:
generate an instruction to control a gaming application in accordance with the estimated posture.

9. The information processing apparatus of claim 1, wherein the circuitry is further configured to:
determine a gesture of the at least the part of the human subject based on the estimated posture.

10. The information processing apparatus of claim 1, wherein the circuitry is further configured to:
determine whether the estimated posture corresponds to one of predetermined postures.

11. The information processing apparatus of claim 1, wherein the circuitry is configured to:
output, using the plurality of points and a plurality of lines indicative of the estimated position of the joint, the joint position data.

12. A method, comprising:
obtaining, using an imaging device, an image of at least a part of a human subject;
estimating, using circuitry, a position of a joint of the human subject based on the obtained image, the joint being a place at which two parts of the human subject are joined;
outputting, using a plurality of points indicative of the estimated position of the joint, joint position data indicative of the estimated position of the joint and estimation accuracy data indicative of an accuracy of the estimated position of the joint based on an estimation result of the position of the joint; and
estimating a posture of the human subject based on the output joint position data and the output estimation accuracy data.

13. The method of claim 12, wherein
the estimation accuracy data is generated by a discriminator learned by a machine learning.

14. The method of claim 13, wherein
the discriminator is learned by Boosting.

15. The method of claim 12, wherein
the joint position data includes position information of a coordinate of the image data, and
the position information of the coordinate indicates two-dimensional coordinate of each joint of the human subject.

16. A non-transitory computer-readable medium storing instructions that, when executed by at least one processor, cause the at least one processor to perform a method, comprising:
obtaining, using an imaging device, an image of at least a part of a human subject;
estimating a position of a joint of the human subject based on the obtained image, the joint being a place at which two parts of the human subject are joined;

outputting, using a plurality of points indicative of the estimated position of the joint, joint position data indicative of the estimated position of the joint and estimation accuracy data indicative of an accuracy of the estimated position of the joint based on an estimation result of the position of the joint; and estimating a posture of the human subject based on the output joint position data and the output estimation accuracy data.

17. The non-transitory computer-readable medium of claim 16, wherein the estimation accuracy data is generated by a discriminator learned by a machine learning.

18. The non-transitory computer-readable medium of claim 17, wherein the discriminator is learned by Boosting.

19. The non-transitory computer-readable medium of claim 16, wherein the joint position data includes position information of a coordinate of the image data, and the position information of the coordinate indicates two-dimensional coordinate of each joint of the human subject.

* * * * *